United States Patent [19]
Feichtinger et al.

[11] 3,920,713
[45] Nov. 18, 1975

[54] PROCESS FOR THE PRODUCTION OF ALKOXIDES OF MAGNESIUM AND ALUMINUM

[75] Inventors: Hans Feichtinger, Dinslaken; Heinz Noeske; Hans-Walter Birnkraut, both of Oberhausen, all of Germany

[73] Assignee: Ruhrchemie Aktiengesellschaft, Oberhausen-Holten, Germany

[22] Filed: Dec. 7, 1973

[21] Appl. No.: 422,973

[30] Foreign Application Priority Data
Dec. 15, 1972  Germany.............................. 2261386

[52] U.S. Cl. .... 260/448 AD; 260/429 R; 260/632 A
[51] Int. Cl.² .......................................... C07F 5/06
[58] Field of Search...... 260/448 AD, 632 A, 429 R

[56] References Cited
UNITED STATES PATENTS
| | | | |
|---|---|---|---|
| 2,412,469 | 12/1946 | Nicholl et al. | 260/448 AD |
| 2,636,865 | 4/1953 | Kimberlin | 260/448 AD |
| 3,305,571 | 2/1967 | Cenker | 260/448 AD |
| 3,446,828 | 5/1969 | Buzas et al. | 260/448 AD |
| 3,657,361 | 4/1972 | Lenz et al. | 260/632 A X |
| 3,717,666 | 2/1973 | Kobetz et al. | 260/448 AD |

FOREIGN PATENTS OR APPLICATIONS
198,316   8/1967   U.S.S.R.

OTHER PUBLICATIONS
Russian Chemical Reviews (Uspekhi Khimii) Vol. 74, pp. 164–165 (1965).
Chemical Abstracts, Vol. 47, 11220b (1953).

Primary Examiner—Helen M. S. Sneed
Attorney, Agent, or Firm—Bierman & Bierman

[57] ABSTRACT

Metal alkoxides of metals from Groups IIA and IIIA of the periodic table are prepared by reacting the metals with low molecular weight alcohols at a temperature of about 100°–200°C in the presence of aliphatic, cyclo-aliphatic, or aromatic hydrocarbons or mixtures thereof.

11 Claims, No Drawings

PROCESS FOR THE PRODUCTION OF ALKOXIDES OF MAGNESIUM AND ALUMINUM

Metal alkoxides, as for instance magnesium alkoxide, are used for numerous processes in the field of the organic synthetic chemistry. They are generally prepared according to the method of H. Meerwein and R. Schmidt by heating magnesium shavings and the alcohol to be converted under reflux (Liebigs Annalen der Chemie 444, 236 [1925]). Since magnesium must be activated with a small amount of mercury (II) chloride and/or iodine in order to start the reaction, the reaction products are always contaminated by certain amounts of inorganic compounds which are difficult to remove.

From U.S. Pat. No. 2,965,663 it is known to react metals of Group IA, IIA and IIIA of the periodic table directly with alcohols under reflux, the vapours leaving the reaction vessel being condensed and the condensate recycled. The drawback of this process is the extremely low reaction rate of elements of Group IIA and IIIA. Although the surface of the metal shavings is always laid open by the streaming alcohol, 60 hours are required for the preparation of aluminum isopropylate according to example 1 of said patent specification. A further drawback of the known process is the continuous heat input required for maintaining the circulation of the alcohol.

According to another known process (German Offenlegungsschrift No. 1,806,549), the alcohol to be reacted with the metal is treated with 0.5 to 5% by weight of an orthoformic acid ester and, in the cases of ethanol and magnesium converted in the presence of p-toluene sulfonic acid in order to attain the conversion of the reactants to the desired alkoxide. The difficulty in separation of the added sulfonic acid as described in said patent, is a serious disadvantage of the known process. Furthermore, the long pretreatment times required, i.e., 20 hours for the conversion of magnesium and ethanol, represent a serious drawback. Moreover, the complicated preparation of the respective orthoester to be used, whose alkyl groups must correspond to the alcohol to be converted, and the required relatively high amount thereof (14 to 50% with respect to the starting metal), detract from the performance of said process on a technical scale. With this process, it is impossible to separate the reaction product by filtration or centrifuging, so that the alcohol used in a high excess must be removed by involved distillation in order to obtain the reaction product as solid residue.

The preparation of aluminum isopropylate by reaction of a mixture of aluminum and alkylaluminum compounds with isopropanol, preferably in the presence of an inert solvent and under exclusion of oxygen is described in German Pat. No. 1,237,998. This process also requires activators. The reaction mixture is worked up by separating the diluent and excess isopropanol under slight vacuum and fractionating the residue at about 2 Torr, to obtain at 112° to 120°C pure aluminum isopropylate.

It is an object of this invention to provide a process whereby pure alkoxides are obtained without the use of catalysts or activators. Furthermore, the end products are separable from the reaction mixture by filtration or centrifuging, and are thus produced in a simple fashion with low power requirements. The process can be carried out in a single working stage to yield metal-free alkoxides.

The process for the production of alkoxides of metals of group IIA and IIIA of the periodic table by reaction of the metals with alcohols according to the invention comprises reacting group IIA and IIIA metals with the respective alcohol at temperatures between 100° and 200°C, preferably between 100° and 150°C in the presence of aliphatic, cycloaliphatic, or aromatic hydrocarbons or mixtures thereof.

Many alcohols are practicable for the present process, depending on the alkoxide product desired, but the most practical are those alcohols having 1 to 9 carbon atoms in their structure. Especially useful are lower molecular weight alcohols having 1 to 4 carbon atoms. It was found that especially good results are obtained when the alcohol is present in about a 150 to 300% molar excess over the metal present.

The amount of the added hydrocarbon can vary, but it has been found that 5 to 20% by weight of hydrocarbon based on the weight of the alcohol to be converted provides excellent results. Especially well suited is the addition of 5 to 10% by weight of one or several hydrocarbons, dependent upon the amount of the alcohol to be converted. This affords especially easily filterable products.

The hydrocarbons useful in this process are many, but it has been found especially advantageous to use benzene, toluene, xylene isomers, liquid aliphatic hydrocarbons, either pure or mixtures, boiling at about 100° to 150°C, cyclohexane or mixtures of these. Other useful hydrocarbons include n-hexane, n-heptane, ethylbenzene, cumene, and mesitylene.

It has also been discovered that the filtration velocity can be significantly increased by the addition of 1 to 20% by weight (based on the metal to be converted), of an auxiliary alkoxide of metals of groups IIA and IIIA of the Periodic Table. Addition of 3 to 10% by weight of alkoxide proved to be especially advantageous. It is preferred to add the same alkoxide as the desired product, since it does not have to be separated from the reaction product. The process according to the invention is particularly well suited for the reaction of magnesium or aluminum, especially with methanol, ethanol and the isomers of propanol and butanol.

The pressure to be optionally maintained depends upon the alcohols to be reacted and the hydrocarbons present in the reaction mixture. If $C_6$ to $C_9$ alcohols are reacted in the presence of corresponding hydrocarbons, the required reaction temperature can be attained without pressure. On the other hand, $C_1$ to $C_4$ alcohols having boiling points below the reaction temperatures of this invention must be reacted under a corresponding pressure.

The resulting products are finely divided and do not cake appreciably so that no formation of agglomerates enclosing unreacted metal occurs. It is thus possible to separate the alkoxides by filtration or centrifuging. As has been found from observation of representative tests, reaction products having been prepared with the use of pure alcohols in absence of hydrocarbons can not be separated by filtration, since in this case products are obtained which are unfilterable or difficult to filter. Owing to the facility of the separation of the reaction products by filtration or centrifuging, provided by the present invention it is possible to perform the reaction process continuously.

The reaction proceeding at elevated temperatures may be performed in simple pressure vessels of steel. It is preferred to carry out the reaction at a preselected pressure, which may be advantageously attained by means of hydrogen, the pressure being maintained relatively constant by venting excess hydrogen. In this manner unreacted alcohol is prevented from escaping from the reaction vessel.

Pressures between 5 and 20 atmospheres are generally used, the reaction times ranging between 3 and 5 hours. In order to obtain the pure metal alkoxide the moist alkoxide separated by filtration is freed from adhering alcohol and hydrocarbon by drying it under vacuum at temperatures from 50° to 100°C. The final drying may be performed with any other process known in the art, as for instance by use of a centrifugal drier.

The resulting metal alkoxides are free of metal and may be used for instance for the condensation of compounds containing carbonyl groups according to the Tischenko reaction or as carriers for polymerization catalysts.

The following examples illustrate the process according to the invention.

EXAMPLE 1

250 g magnesium shavings, 1900 g pure anhydrous ethanol and 150 g toluene were introduced into a 5 liter autoclave having a pressure-resistance of 20 atmospheres gauge provided with a waste-gas outlet with added pressure-condenser. After having been flushed with hydrogen and pressurized to 10 atmospheres gauge, the autoclave was heated to 120°C. At about 90°C, evolution of hydrogen commenced. The pressure was maintained at about 10 atmospheres gauge by draining off evolved hydrogen. After 3½ hours, the evolution of hydrogen was finished; thereafter the reaction mixture was kept at the same temperature for a final reaction period of about 2 hours. After cooling, a fine granular dispersion of the resulting magnesium ethylate in the ethanol toluol mixture was discharged from the autoclave. After filtration and drying during 2 hours at 60°C and 20 Torr, 1062 g magnesium ethylate, having a magnesium content of 21.5% were obtained.

EXAMPLE 2

(Comparison Test)

As described in Example 1, 250 g magnesium shavings and 1900 g pure anhydrous ethanol were reacted at 120°C in the autoclave. The reaction was finished after 4 hours. After a final reaction period of 2 hours and cooling of the autoclave a dispersion of pulverulent magnesium ethylate was obtained which could not be separated by filtration since after an extremely short filtration time the filter became clogged and no further filtering was possible. Ethanol could only be separated by thermal treatment at 90°C under vacuum.

EXAMPLE 3

As described in Example 1, 250 g magnesium shavings, 1900 g pure anhydrous ethanol and 475 g toluene were reacted at 120°C in the autoclave. Evolution of hydrogen was finished after 2 hours. After a final reaction period of 2 hours, an easily filterable product was obtained, but which contained a considerable amount of lumps. Further tests were carried out with the amounts of magnesium shavings and alcohol hereinbefore set forth, while the amount of toluene was decreased, the following test results with respect to agglomeration to lumps and filterability being obtained:

| | addition of toluene | | |
|---|---|---|---|
| Weight (grams) | Percent by weight of ethanol | formation of lumps | filtrability |
| 380 | 20 | +¹ | +² |
| 230 | 12 | + | + |
| 190 | 10 | small | + |
| 152 | 8 | −¹ | + |
| 95 | 5 | − | + |
| 0 | 0 | − | −² |

+¹ = considerable amount of lumps
−¹ no formation of lumps
+² = good filterability
−² not filterable

EXAMPLE 4

As described in Example 1, the autoclave was charged with 250 g magnesium shavings, 1435 g ethanol and 175 g gasoline having a boiling range of from 130° to 155°C and the reaction performed at 120°C. After 3¼ hour, evolution of hydrogen was finished and the same temperature was maintained for a final reaction time of 2 hours. A fine-granular easily filterable dispersion free of lumps was obtained, which after having been dried at 60°C and 20 Torr, yielded 1145 g magnesium ethylate having a magnesium content of 21.5%.

EXAMPLE 5

As described in Example 1, 200 g magnesium shavings, 2400 g n-propanol and 150 g benzene were reacted in the autoclave at 130°C. After 4 hours, evolution of hydrogen was finished. Thereafter a final reaction was allowed to proceed for 2 hours and the magnesium n-propylate separated by filtration. From the filtration residue 1100 g magnesium propylate having a magnesium content of 17.6% were isolated by drying at 100°C and 20 Torr.

EXAMPLE 6

In a 5 liter autoclave having a 100 atmosphere pressure capacity and provided with the equipment described for the autoclave of example 1 was charged with 135 g aluminium shot, 2230 g isobutanol and 150 g toluene. The reaction was conducted at 120°C under the conditions set forth in Example 1. The reaction was finished after 1 hour.

Owing to the rapidly proceeding reaction of the reactants hereinbefore mentioned, an especially intensive cooling of the autoclave during the conversion was required. After a final reaction time of 2 hours 1050 g aluminium isobutylate, having an aluminium content of 11.1% were recovered by filtration. By evaporation of the filtrate, further 125 g product were obtained.

EXAMPLE 7

An autoclave as described in example 1 was charged with 250 g magnesium shavings, 1900 g ethanol and 100 g toluene, which were converted at 120°C in the manner hereinbefore described. The evolution of hydrogen was finished after 3 hours and the reaction mixture was kept at 120°C for a final reaction time of 2 hours. A fine granular dispersion free from lumps was obtained. The filtration of the dispersion continued for 150 minutes. After drying of the filtration residue at 60°C and 20 Torr, 1110 g magnesium ethylate having a magnesium content of 21.4% were obtained.

EXAMPLE 8

The reaction described in example 7 was repeated with addition of 13 g magnesium ethylate to the reaction mixture. After 2 ¾ hours the evolution of hydrogen was finished and the reaction mixture was held at the same temperature for 2 additional hours. A fine-granular dispersion free of lumps resulted. The filtration of the reaction mixture under the conditions described in example 7 required only 20 minutes, the residue yielding after having been dried at 60°C and 20 Torr 1125 g magnesium ethylate having a magnesium content of 21.3%.

By "metal-free alkoxide" is meant an alkoxide product substantially free of unreacted metal.

What is claimed is:

1. A process for preparing a metal-free alkoxide of magnesium or aluminum which comprises reacting magnesium or aluminum with an alcohol containing 1-9 carbon atoms at a temperature of about 100°-200°C., and at a pressure of 5-20 atmospheres gauge of hydrogen, in the absence of a catalyst, the reaction being conducted in the presence of a liquid hydrocarbon selected for the group consisting of aliphatic, cycloaliphatic and aromatic hydrocarbons and mixtures thereof, and recovering said alkoxide.

2. The process of claim 1 in which the alcohol is methanol, ethanol, n-propanol, isopropanol, n-butanol, sec-butanol or tert-butanol.

3. The process of claim 1 in which the alcohol is present in a stoichiometric amount greater than the stoichiometric amount of the metal.

4. The process of claim 3 in which the alcohol is present in about a 150 to 300% molar excess over the metal present.

5. The process of claim 1 in which the temperature is about 100° to 150°C.

6. The process of claim 1 in which the hydrocarbon is present in an amount of about 5 to 20% by weight based on the amount of alcohol employed.

7. The process of claim 1 in which the hydrocarbon is present at about 5 to 10% by weight based on the amount of alcohol employed.

8. The process of claim 1 in which the hydrocarbon is benzene, toluene, xylene, an aliphatic hydrocarbon liquid having a boiling point of about 100° to 155°C, or cyclohexane.

9. The process of claim 1 in which the reaction is conducted in the presence of an auxiliary alkoxide of magnesium or aluminum, the auxiliary alkoxide being present in an amount of about 1 to 20% by weight based on the weight of the metal employed.

10. The process of claim 9 in which the auxiliary alkoxide added is the same as the alkoxide prepared by the process.

11. The process of claim 1 in which the alcohol is methanol, ethanol, n-propanol, iso-propanol, n-butanol, sec-butanol or tert-butanol; the temperature is about 100°-150°C; the reaction is conducted in the presence of about 3 to 10% by weight of the alkoxide to be formed, based on the weight of the metal; and the hydrocarbon is benzene, toluene, xylene, an aliphatic hydrocarbon liquid having a boiling point of about 100° to 155°C, or mixtures thereof; the reaction being conducted in the presence of hydrogen at a partial pressure such that the sum of the partial pressures of the reactants is about 5 to 20 atmospheres gauge.

* * * * *